United States Patent [19]

Summerlin et al.

[11] 3,800,581

[45] Apr. 2, 1974

[54] FASTENER

[75] Inventors: Frederick Arthur Summerlin, St. Albans; Harvey Philip Jeal, Stevenage, both of England

[73] Assignee: Aerpat A.G., Zug, Switzerland

[22] Filed: Aug. 24, 1972

[21] Appl. No.: 283,419

[30] Foreign Application Priority Data
  Aug. 24, 1971  Great Britain.................... 39676/71

[52] U.S. Cl. ...................................... 72/71, 81/10
[51] Int. Cl. ........................................... B25b 27/00
[58] Field of Search .......... 72/71; 29/243.54; 81/10

[56] References Cited
UNITED STATES PATENTS
3,618,352  11/1971  Mink ..................................... 72/71
FOREIGN PATENTS OR APPLICATIONS
780,367  7/1957  Great Britain................... 29/243.54

*Primary Examiner*—Lowell A. Larson
*Attorney, Agent, or Firm*—Oblon, Fisher, Spivak, McClelland & Maier

[57] ABSTRACT

A tool and a method for cropping off a portion of a fastener stem which projects from the body of a fastener and for simultaneously locking the remaining part of the stem in the body of the fastener is disclosed. The tool comprises a pair of cutting wheels each of which is mounted for rotation about its own axis and is bevelled to a peripheral cutting edge. The two cutting wheels are movable towards and away from each other and in an orbit about an axis passing between them. A fastener stem is cropped by inserting it along the axis between the cutting wheels and moving the wheels in orbit around the stem while forcing them towards each other. The bevelled edges of the cutting wheels cut into the stem so that the projecting portion is cropped off and also deform the material of the stem to form an enlargement of the part of the stem which is retained in the body of the fastener which locks the retained part in the fastener body. The tool has an ejector for expelling the cropped-off portion of the stem.

12 Claims, 7 Drawing Figures

PATENTED APR 2 1974

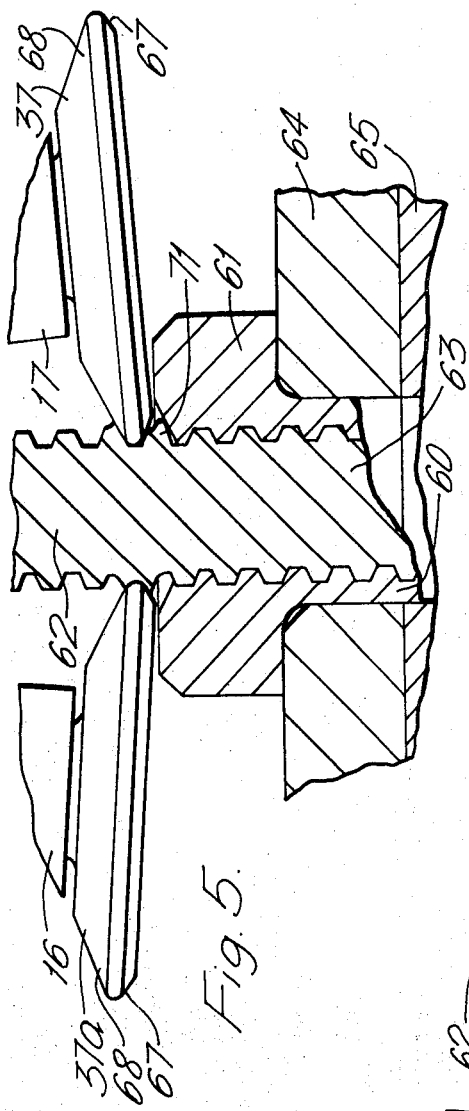
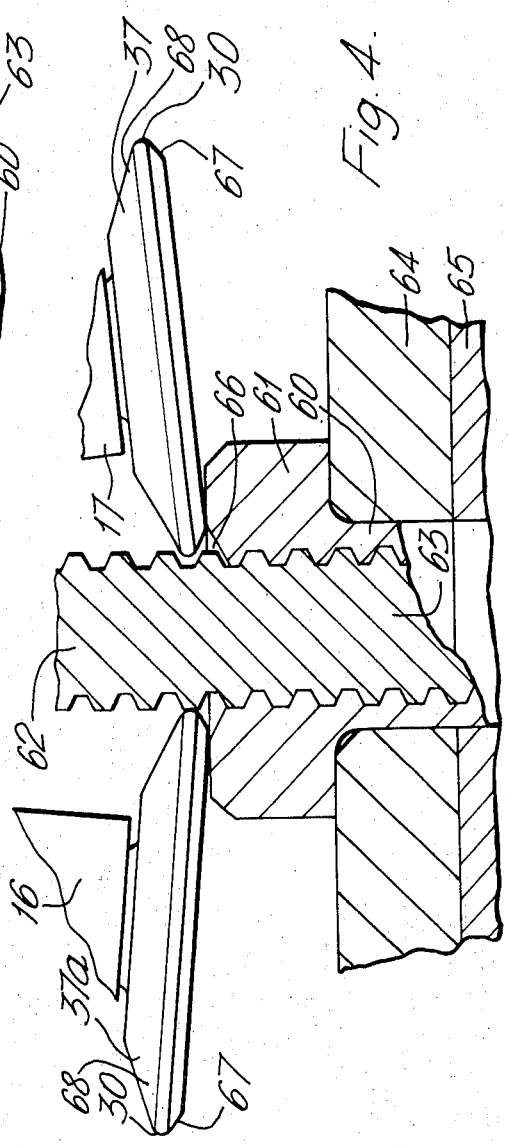

FASTENER

BACKGROUND OF THE INVENTION

The invention relates generally to fasteners of the type comprising a body with a head at one end and a stem which projects from the head and is moved relatively out of the head to cause the formation of a blind head at the remote end of the body, and more particularly the invention relates to a method of and a tool for both cropping off the projecting portion of the stem and locking the remaining part of the stem in the body of such a fastener after the blind head has been formed so that the remaining part of the stem is retained in the body.

Prior art devices provided for the same general purpose of cutting off fastener stem projections and deforming the same to lock the remaining part of the stems against the bodies being fastened have been complicated and cumbersome, generally being adapted for bench use. They also have been readily subject to damage of parts thereof during use, such as, for example, of the cutting wheels, through engagement thereof with each other during operation and through inadvertent jamming between the fastener stem being cut and the arms carrying the wheels.

SUMMARY OF THE INVENTION

Accordingly, it is an object of the present invention to provide a tool for cropping off a projecting portion of the stem of a fastener and locking a retained part of the stem in the body of the fastener which is relatively simple in construction and avoids engagement of the cutting wheels thereof while providing for elimination of the cropped off stem portion without damaging the device.

Another object of the present invention is the provision of an improved method of cropping off a projecting portion of the stem of a fastener and locking a retained part of the stem in the body of the fastener.

Accordingly, the invention provides, in one of its aspects, a method of both locking the stem of a fastener and cropping the projecting portion of the stem in one operation, which method comprises the steps of applying a pair of opposed cutter wheels to the stem adjacent the head of the body, and rotating the pair of cutter wheels about the stem while forcing them towards each other, whereby the cutter wheels both sever the projecting part of the stem and deform outwardly part of the material of the retained part of the stem to form a swelling or enlargement thereof so as to lock the retained part of the stem against retraction into the body.

The invention provides, in another of its aspects, a method of both locking the stem and cropping the projecting portion of the stem in one operation on a fastener in which the head of the body has a countersink or other annular recess immediately surrounding the stem, which method comprises the steps of applying a pair of opposed cutter wheels to the stem at a position immediately adjacent the annular recess, and rotating the pair of cutter wheels about the stem while forcing them towards each other, and thereby causing the cutter wheels both to sever the projecting part of the stem and to deform outwardly into the annular recess part of the material of the retained part of the stem so as to form a swelling or enlargement thereof which locks the retained part of the stem against retraction into the body.

The invention provides, in still another of its aspects, a tool for both cropping off a projecting portion of the stem of a fastener and locking a retained part of the stem in the body of the fastener, the tool comprising a pair of opposed cutter wheels rotatable about the axis of the stem of the fastener, and means for forcing the cutter wheels towards each other as they are rotated about the stem axis to crop the stem and to deform part of the material of the stem radially outwards to form a swelling or enlargement on the retained part of the stem which is capable of locking the retained part of the fastener stem to the body. The tool also includes a device for receiving the portion of the stem to be cropped off and which is spring loaded to assist in ejection of the cropped-off part of the stem from the tool after operation thereof.

The invention provides, in yet another of its aspects, a tool for both cropping off a projecting portion of the stem of a fastener and locking a retained part of the stem in the body of the fastener in one operation, which tool comprises a housing, a member rotatable with respect to the housing about an axis, a pair of opposed arms each being mounted on the member for pivoting movement about a position near one end of the arm, a pair of opposed cutter wheels each being mounted on the other end of the two arms respectively, a cam member engageable with the two arms, and an actuating member connected to the cam member by a rotary thrust bearing, whereby axial advancement of the actuating member relative to the rotatable member causes the cam member to force the two arms to pivot towards each other and thus force the cutter wheels towards each other, while allowing the cam member to rotate about the axis due to its engagement with the arms.

The tool may, if desired, be provided in the form of a tool head attachable to a powered rotary motor.

BRIEF DESCRIPTION OF THE DRAWINGS

Various other objects, features and attendant advantages of the invention will be more fully appreciated as the same becomes better understood from the following detailed description when considered in connection with the accompanying drawings in which:

FIGS. 4, 5, 6 and 7 are section views on an enlarged scale, through part of a fastener showing the successive stages in the operation of the tool of the present invention on the fastener stem.

DESCRIPTION OF A PREFERRED EMBODIMENT

In this embodiment of the invention, the tool head is attached to and driven by a reversible air-powered hand-held motor of a type commonly used in the mechanical assembly industry.

Figure 1:
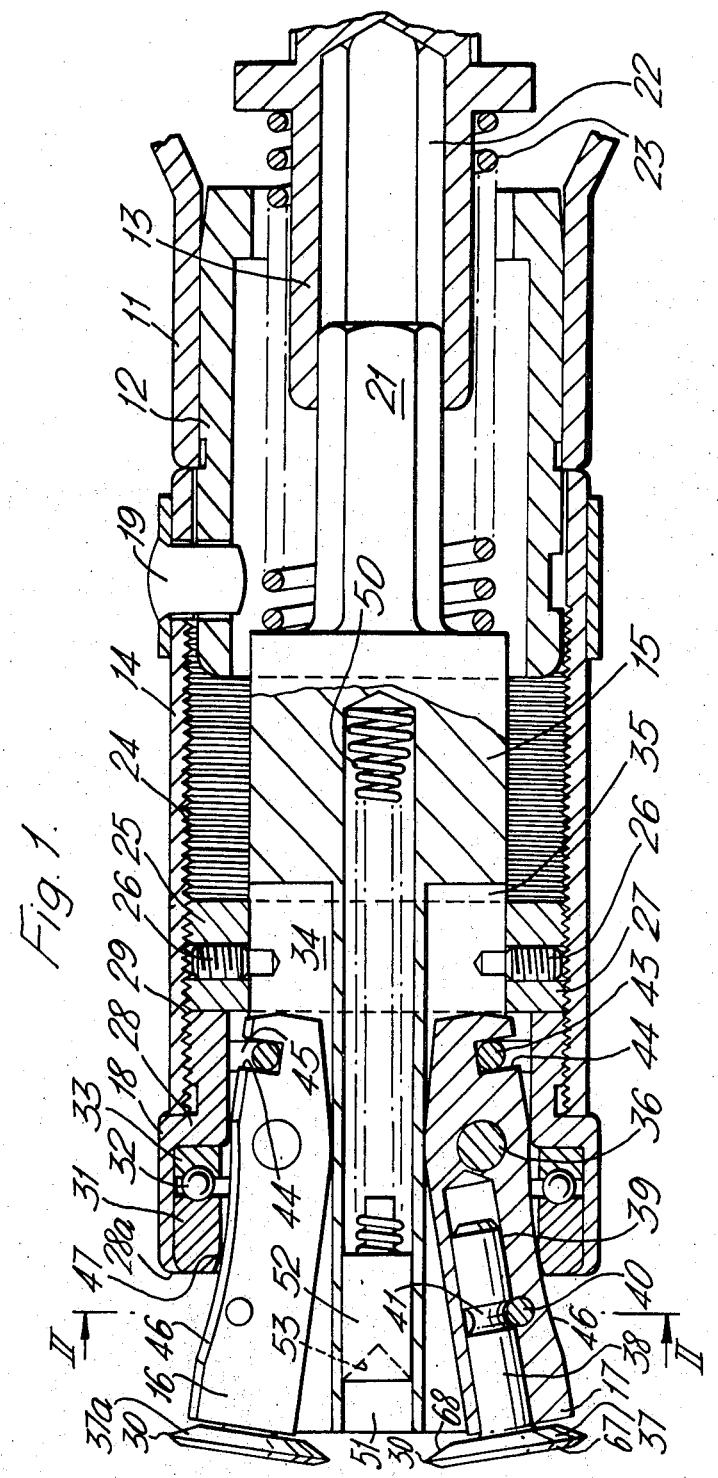
FIG. 1 is a longitudinal section through a tool head formed according to the present invention and showing the cutter wheels in their initial or open position.

As is indicated in FIG. 1, the air motor includes an outer casing 11 to which is secured a tubular nosepiece 12 in which is disposed a drive shaft 13. The cutter tool head of this embodiment comprises essentially a tubular outer housing 14, an inner, generally cylindrical rotatable member 15 on which are pivotally mounted two opposed cutter arms 16 and 17, respectively, and an annular cam assembly 18. The rear end of the tubular housing 14 is releasably secured to the motor nosepiece 12 by means of a sprung stud 19, and the rear end of the rotatable member 15 is formed with a hexagonal-section extension 21 which drivingly engages in a hexagonal-section socket 22 in the motor drive shaft 13. This hexagonal key-and-socket arrangement enables relative axial movement to take place between the motor driven shaft 13 and the rotatable member 15, which are urged axially apart by means of a helical compression spring 23 acting therebetween.

The interior of the tubular housing 14 is screw-threaded as indicated at 24. An externally threaded annulus 25 is mounted around the rotatable member 15 about mid-way along its length and is secured to it by means of screws 26. The peripheral surface of the annulus 25 carries screw-threads 27 which engage with the threads 24 inside the tubular housing 14. Thus, as the rotatable member 15 is rotated in one sense, the annulus 25 and member 15 will be screwed in a forward direction relative to the tubular housing 14, or towards the left as viewed in FIG. 1, and when the rotational member 15 is rotated in the opposite sense, the annulus 25 and member 15 will be retracted rearwardly, or towards the right as viewed in FIG. 1.

The annular cam assembly 18 comprises a stepped tubular holder 28, the narrower end of which is externally threaded at 29 and is screwed into the forward end of the tubular housing 14 to which it is secured by screws, not shown, passing through the tubular housing 14. The larger diameter part of the holder 28, which lies outside the front end of the tubular housing 14, contains a thrust bearing comprising a rotatable annular cam ring 31, a ball race 32 and an annular thrust ring 33 which is secured to the holder 28. The rotatable annular cam ring 31 is a clearance fit within the holder 28, the front end of the holder being peened slightly inwardly at 28a to retain the cam ring 31.

Figure 2:
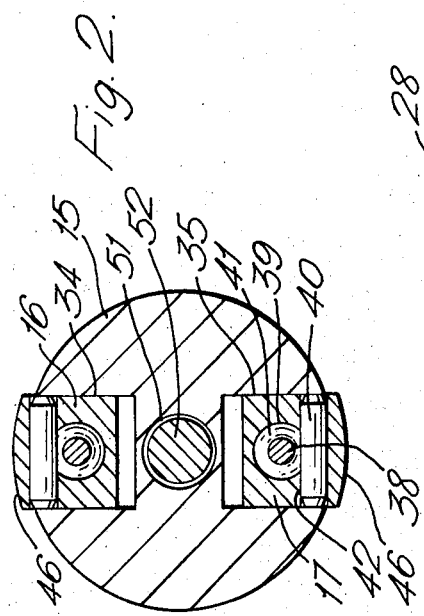
FIG. 2 is a cross-section view taken along the line II—II of FIG. 1.

The arms 16 and 17 are mounted in diametrically opposed slots 34 and 35, respectively, in the member 15, shown best in FIG. 2, which extends about two-thirds of the way back along the rotatable member 15 from the front end thereof. Associated with each arm is a cutter. As the two arms and their associated parts are identical with each other, only the arm 17 will be described in detail here. Thus, in FIG. 1, the arm 17 is shown in section to reveal the construction therewithin, whereas the arm 16 is not shown in section. A substantial pivot pin 36 is mounted in the member 15 and extends across the slot 35, about half way along the axial length of the slot. The arm 17 is mounted on this pin, the pin being positioned about two-thirds of the way back along the arm from its front end as illustrated in FIG. 1. A cutter comprising a cutting wheel 37 and an integral axial shaft 38 is mounted in the arm. On arm 16, the cutter is designated as 37a. The shaft 38 is received within a cylindrical bore 39 extending rearwardly into the arm 17 from the front face thereof and the cutter is retained in the arm by means of a retaining pin 40 which passes transversely across the outer edge of the bore 39 and engages in a peripheral groove 41 around the shaft 38. Thus the cutter is mounted for rotation within the bore 39 about the axis of the cutter shaft 38. The retaining pin 40 is a push fit within a bore 42 in the arm and is also prevented from falling out by the presence of the side walls of the groove 35 at each end of the bore 42.

Figure 3:
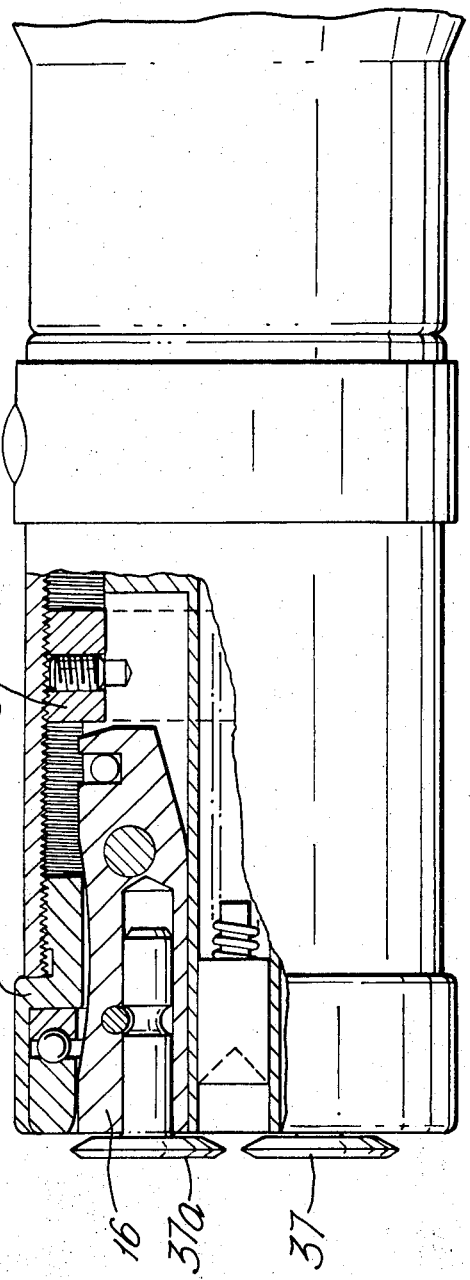
FIG. 3 is a side view of the tool head shown in FIG. 1, being partly broken away, and showing the cutter wheels in their final or closed position.

The two arms 16 and 17 are spring biased so that their front ends and the two cutting wheels 37 and 37a are urged mutually apart. In the tool of this example, this biasing is achieved by the radially inward pressure of a garter spring 43 which is disposed around the outside of the two arms 16 and 17 near their rear ends. The garter spring is accommodated in a slot 44 across each arm and in an annular groove 45 in the internal surface of the rotatable member 15. The biasing action of the garter spring urges the arms to pivot about the pins 36 so as to bring the outer face of each arm into contact with the internal surface of the cam ring 31. As the rotatable member 15 moves axially backwards and forwards within the tubular housing 14, the arms slide along the cam ring 31. The outside of each arm is provided with a suitably shaped cam face 46 for sliding contact under pressure with a radially inner face of the cam ring 31 which has an appropriately curved part 47 at the forward end. The shape of the cam face 46 and its relationship to the contacting curved part 47 of the cam ring 31 and the respective arm pivot 36 is such that, as the rotatable member 15 and the arms are retracted rearwardly into the tubular housing 14, the relative movement of the cam faces 46 of the arms past the cam ring 31 causes the front ends of the arms to move towards each other so that the cutting wheels 37 and 37a close together FIG. 1 illustrates the tool in the position in which the rotatable member 15 is in its forwardmost position with the annular threaded ring 25 hard up against the rear end of the cam holder 28, and the cutting wheels 37 and 37a are in their fully open position. FIG. 3 illustrates the position of the tool in which the rotatable member 15 is in its fully retracted position, with the cutting wheels 37 and 37a closed towards each other as far as possible. It will be seen from FIG. 3 that a small gap exists between the cutting wheels in this position, since it is undesirable that the two wheels should meet under pressure because this would cause damage to them. It will also be noted that, in the fully closed position illustrated in FIG. 3, the rotational axes of the two rotatable cutters are parallel with each other and with the main axis of rotation of the rotatable member 15.

Each cutting wheel is in the form of a disc which is bevelled adjacent its peripheral edge so as to have a front bevel 67 and a rear bevel 68. Although in FIGS. 1 and 3, the bevels of the cutting wheels 37 and 37a appear to meet at a sharp peripheral cutting edge 30. FIGS. 4 to 7, which are on a larger scale, show that the cutting edges 30 are in fact radiused. In practice, it has been found desirable for the cutting edges to have a small radius, such as in the range from 0.006 inch to 0.01 inch, or 0.15 – 0.25 mm, and it is merely for ease of illustration that in FIGS. 1 and 3 no radius is shown. The rear bevel 68 is somewhat larger than the front bevel 67 so that the cutting edge is disposed slightly nearer to the front face of the cutting wheel.

One of the functions of this tool is to crop off the projecting portion of the stem of a fastener, and, in order to accommodate this projecting portion when the tool is in use, the rotatable member 15 is provided with a central axial bore 51 extending from the front end of the member a considerable distance towards its rear end. In order to assist in ejecting the cropped-off portions of stems from this bore after use of the tool, the bore 51 is provided with an ejector 52 in the form of a piston which is slidable in the bore. The ejector is biased forwardly by means of a helical compression spring 50. The rear end of the spring 50 is radially enlarged so as to jam into the rear end of the bore 51 and the front end of the spring is a tight fit on a spigot projecting from the rear end of the ejector pistion. The front end of the ejector has a conical countersink 53 which is intended to receive the end of a stem and prevent it from fouling the inside of the bore 51.

In order to explain more clearly the method of use of the tool, successive stages in the cropping and locking of a particular fastener by the cutters are illustrated in FIGS. 4 to 7. The particular fastener employed in this example is one in which an externally threaded stem engages in an internally threaded tubular body, the stem being rotated with respect to the body to retract it relative to the body and form a blind head on the fastener in order to set the fastener. Thus when the fastener has been set, a portion of the stem projects outwardly from the body. Similar fasteners are commerically available in many countries under the registered trademark JO-BOLT. In FIGS. 4 to 7 the body of the fastener is indicated at 60, its head at 61, the projecting portion of the stem at 62, the part of the stem which is eventually retained within the body at 63, and the two sheets in which the fastener has been set and which it holds together at 64 and 65, respectively. The construction of the blind head of the fastener forms no part in the present invention and is not described or shown here. The head of the fastener body is provided with a small countersink 66 in order to receive a burr which is produced by the action of the tool as will be described below.

Figure 6:
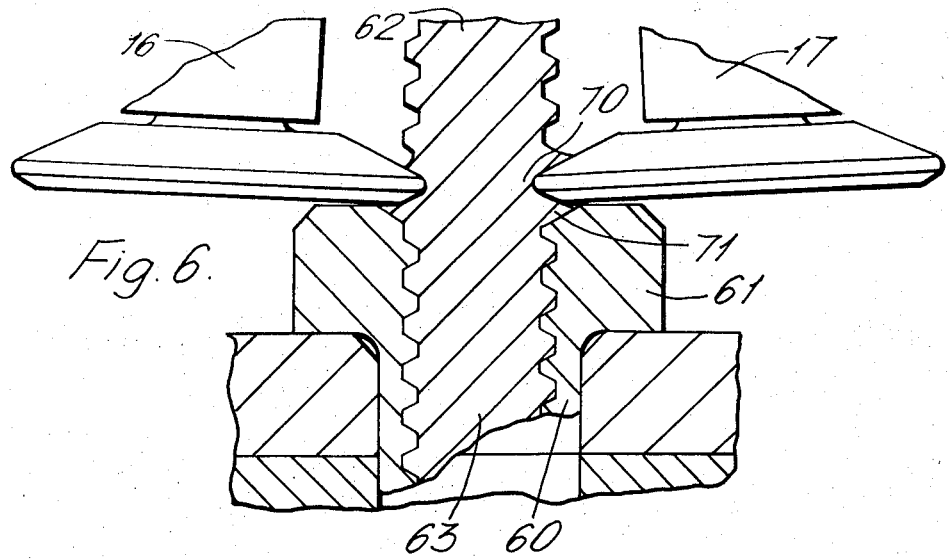
Figure 7:
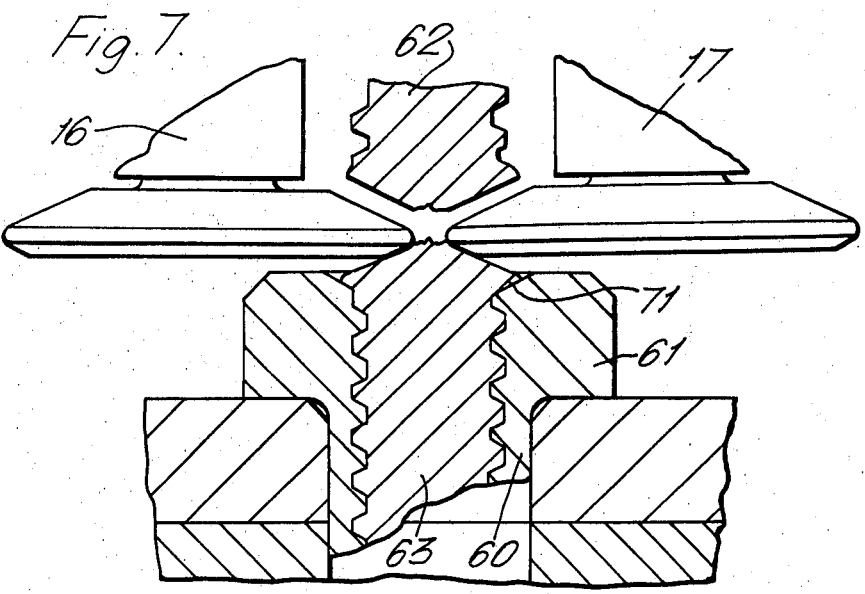

The operation of the tool is as follows. At the start of the operation, the tool has its cutters in the fully opened position as illustrated in FIG. 1. If necessary, it is put in this condition by running the air motor in reverse to screw the member 15 and the cutters to the fully forward position. The tool is offered up while at rest to the projecting portion of the stem of the set fastener so that the projecting portion 62 enters into the ejector bore 51 and engages the ejector piston 52. The tool is held so that the rotational axis of the member 15 coincides with the axis of the stem of the fastener, or in other words, in normal practice the tool is held perpendicular to the surface of the work from which the fastener protrudes. The portion of each cutting wheel which will contact the head of the fastener body is the part which is most forward of each wheel on the circular line at which the flat front face of the wheel and the front bevel 67 of the wheel meet and which is radially nearest the fastener stem. The operator then switches on the air motor in the forward direction so that the member 15 is rotated at high speed thus causing the pair of cutting wheels to move in a circular path at high speed around the axis of the fastener stem, and also causing the cutters to be both closed towards each other and to be retracted axially towards the tool housing. Since the operator is lightly pressing the tool towards the fastener, the cutter wheels remain in contact with the head of the fastener body while the tool housing advances towards it. This combination of movements continues, and the cutting wheels continue to close together until they bite onto the stem of the fastener just outside the head of the fastener body, as illustrated in FIG. 4. As soon as the cutting edges of the wheels contact the stem, the wheels start to rotate about their own axes. The pair of cutting wheels, as they move around the fastener stem, are progressively forced towards each other due to the action of the tool as previously described, and thus progressively roll their way into the fastener stem, progressively producing a neck 70 of reduced diameter. At the same time, the material of the fastener stem is displaced radially outwardly from the region of the neck by the action of the cutting wheels, to form a swelling or enlargement on each side of the position where the wheels enter the stem. FIGS. 5, 6 and 7 show successive stages of the action of the cutting wheels on the stem, the enlargement 71 on the retained portion of fastener stem being fully formed in FIG. 6.

This action continues until the neck formed by the closing rotating cutters becomes so thin that the stem is severed at this position, as shown in FIG. 7, thus cropping the projecting portion of the stem from the rest of the placed fastener. The breaking of the neck is assisted by the wedging action of the inclined faces of the cutting wheels which produces axial tension in the neck. This wedging action also assists in forcing the material in the enlargement 71 tightly into the countersink 66 in the fastener body head. Once the countersink is full of displaced stem material, no further displacement of material in that axial direction can take place. Consequently the wedging action of the front bevelled faces of the cutting wheels tends to drive the cutting wheels axially along the fastener stem away from the head of the body since this part of the stem is free and material can still be displaced in that direction, thus further assisting in the breaking of the neck.

It is believed to be important for the best results in the use of this tool that the front of the cutting wheels should have a bevel in order to produce the enlargement, although in this embodiment we prefer to provide both front and rear bevels. It is also very desirable that a small annular recess or countersink is provided in the fastener body head, around the stem, in order to receive the enlargement. In one example of a tool which has proved successful in practice, the front and rear bevels of each cutting wheel are inclined to the plane perpendicular to the cutting wheel axis at an angle of 25°.

As the free end portion of the stem is pushed away from the set fastener, the ejector spring is compressed still further. When the fastener stem has broken, the tool becomes free from the set fastener. The operator reverses the direction of rotation of the air motor, thus rotating the pair of cutters in the opposite direction so that they are moved apart and release the cropped-off portion of the stem, which is expelled from the bore 51 by the ejector.

It will be apparent from the foregoing description that the tool described in this example provides for cropping off the projecting portion of the stem of a fastener, and, in the same operation, the formation of a swelling or enlargement on the retained part of the fastener stem to assist in locking that stem against retraction into the fastener body. The locking enlargement 71 is fully formed at an early stage in the cropping operation, as shown in FIG. 6, and is complete when the cutting wheels have penetrated only a short distance into the stem.

The invention is not restricted to the details of the foregoing example. For instance, a different arrangement of springing could be employed to bias the cutter wheels apart. A different mechanism might be employed to force the cutting wheels towards each other as they move around the fastener stem. Although in the foregoing example the stem of the fastener is threaded by reason of the nature of the fastener, other fasteners of the kind generally referred to in which the portion of the stem to be cropped-off is not threaded, can also have their stems successfully cropped and the retained part thereof locked in the fastener body by means of the tool of the invention.

Obviously many other modifications and variations of the present invention are possible in light of these teachings. It is to be understood therefore that within the scope of the appended claims, the invention may be practiced otherwise than as specifically described herein.

What is claimed as new and desired to be secured by letters patent of the United States is:

1. A tool for cropping a projecting portion of a stem of a fastener of the kind referred to, which comprises:

a lead screw device including a fixed member and a rotatable member, said fixed member being restrained from actual rotation during use of the tool and said rotatable member being rotatable relative to said fixed member about an axis and being movable relative to said fixed member in forward and rearward directions along said axis;
at least a pair of arms pivotally mounted on said rotatable member and extending forwardly thereof;
a rotatable cutting wheel mounted at the forward end of each of said arms, the cutting wheels being arranged to cut in opposition to each other in a direction transverse to the axis of rotation of said rotatable member, said arms being movable pivotally on said rotatable member to move said cutting wheels between open and closed positions; and
cam means arranged to force said arms to move pivotally so as to move said cutting wheels together when said rotatable member is moved rearwardly with respect to said fixed member.

2. A tool according to claim 1, wherein said cam means is mounted in a fixed axial position with respect to said fixed member.

3. A tool according to claim 1, wherein said cam means is rotatable about the axis of rotation of said rotatable member.

4. A tool according to claim 1, wherein said cam means is an annulus.

5. A tool according to claim 1, wherein the cutting wheels have a radiussed cutting edge and are bevelled towards said cutting edge.

6. A tool according to claim 5, wherein said cam means is axially fixed with respect to said fixed member.

7. A tool according to claim 6, wherein said cam means is rotatably mounted on said fixed member.

8. A tool according to claim 7, wherein said cam means is an annulus arranged peripherally of said arms.

9. A tool for cropping a projecting portion of a stem of a fastener of the kind referred to, which comprises:

an internally threaded housing; a rotatable member within said housing and in threaded engagement therewith;
drive means for rotating said rotatable member relative to said housing;
two arms pivotally mounted on said rotatable member and extending forwardly beyond said rotatable member in a direction away from the means for rotating said member;
a cutting wheel mounted at the forward end of each arm and rotatable relative to the arm in a direction generally transverse to the axis of rotation of said member; and
cam means mounted on said housing and arranged to force the arms to pivot in a direction to move said cutting wheels together when said rotatable member is moved rearwardly relative to said housing in a direction towards said drive means.

10. A tool according to claim 9, wherein said cam means comprises an annulus which surrounds said arms.

11. A tool according to claim 10, further including a ball-thrust bearing for supporting said annulus against rearward movement.

12. A tool according to claim 9, wherein each cutting wheel has a radiussed cutting edge and a bevel adjacent the cutting edge on the forward face of said cutting wheel.

* * * * *